Figure 1:
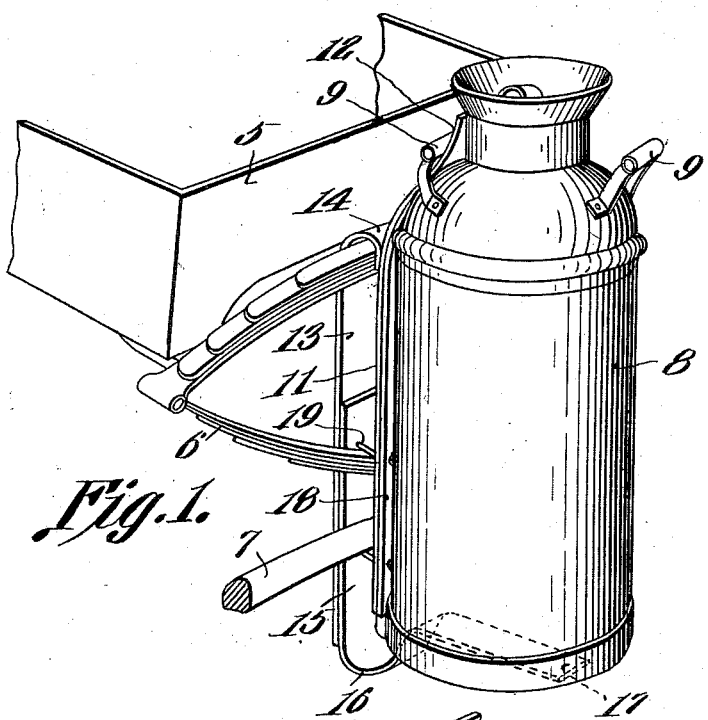

C. H. CRONK.
CAN CARRIER.
APPLICATION FILED SEPT. 22, 1911.

1,018,696.

Patented Feb. 27, 1912.

Witnesses

Inventor
Charles H. Cronk,
C. A. Snow & Co.
Attorneys

UNITED STATES PATENT OFFICE.

CHARLES H. CRONK, OF CURTIS, NEBRASKA.

CAN-CARRIER.

1,018,696.  Specification of Letters Patent.  Patented Feb. 27, 1912.

Application filed September 22, 1911. Serial No. 650,310.

*To all whom it may concern:*

Be it known that I, CHARLES H. CRONK, a citizen of the United States, residing at Curtis, in the county of Frontier and State of Nebraska, have invented a new and useful Can-Carrier, of which the following is a specification.

This invention is a can carrier applicable to vehicles or conveyances, and has for its object to provide a convenient means for carrying milk cans, oil cans and the like.

A further object of the invention is to provide a device of this character adapted to be secured over the leaves of an elliptical spring and axle tree of a buggy or wagon to yieldably support a can upon the axle tree and to permit the free movement of the said spring.

With the above and other objects in view this invention is embodied in the novel arrangement and construction of parts as hereinafter described and pointed out in the appended claims, the invention being illustrated in the accompanying drawings, wherein similar reference characters indicate similar parts, and wherein:—

Figure 2:
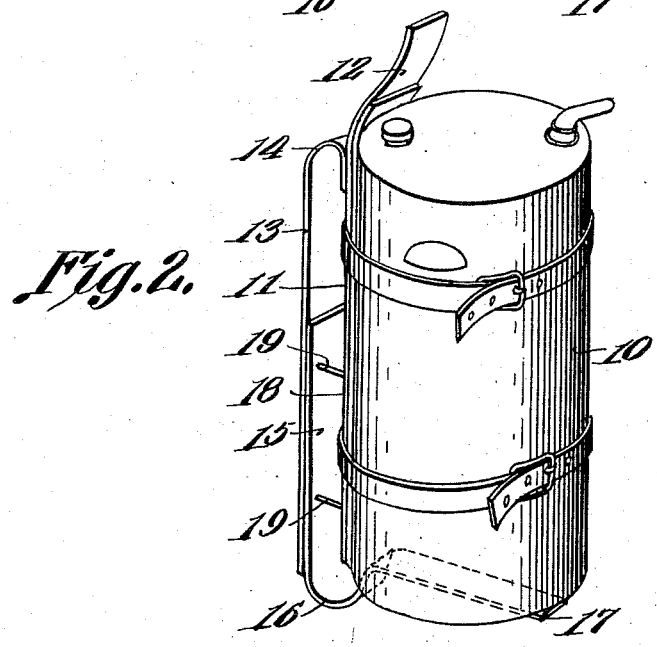

Figure 1 is a fragmental portion of a buggy in perspective showing the carrier applied thereto as in use. Fig. 2 is a perspective view of the carrier as in use.

Referring specifically to the drawings, the rear end of the wagon box or buggy is designated as 5 which is supported above the axle tree 7 by the customary elliptical spring 6.

The carrier comprises an outer or rear upright bar 11, an inner or forward upright bar 13 which is parallel to the bar 11 and has the upper end thereof curved outwardly or rearwardly as designated as 14 and secured to the intermediate portion of the bar 11 by suitable means, and a bar 15 lying partially on the lower end of the inner bar 13 and curved outwardly below the outer bar 11 with the free end thereof horizontal, the curved portion being designated as 16 and the horizontal portion being designated as 17. The upper end of the bar 11 is curved slightly rearward to form an upright arm 12.

The spring 6 and the axle tree 7 are adapted to be received between the bars 11 and 13, the axle tree and the lower leaf of the spring 6 being secured between the lower ends of the said bars by means of the bolts 19 which are passed through the bars 11 and 13 and the bar 15 astride the axle tree and the lower leaf of the spring. Thus upon tightening the bolts the carrier is securely mounted to the axle tree to permit the upper leaf of the spring to move freely between the bars 11 and 13, the bars 11 and 13 being drawn together by the bolts 19 to clamp the axle and lower leaf of the spring therebetween. It is preferable to have a plate 18 arranged on the outer face of the bar 11 against which the heads of the bolts 19 bear. The bolts 19 also serve to secure the bar 15 to the bar 13, the bar 15 forming a resilient support or foot.

In use, when the carrier is used for conveying milk or cream cans, the arm 12 is adapted to engage one of the handles 9 of the cream or milk can which is designated as 8 in Fig. 1 and the can is supported by the resilient foot 17. In Fig. 2 the carrier is shown as supporting an oil can 10, the oil can being strapped to the bar 11. In this manner cans of various descriptions may be conveniently carried on the rear of the wagon or buggy, the resilient foot overcoming the jarring and jolting due to the travel of the wheels over the road. It is customary to carry cans in the front portion of the wagon which is inconvenient and takes up considerable space in the wagon or buggy, and it will therefore be seen that by applying a carrier of this character to the wagon or buggy the cans may be conveniently carried at the rear thereof and will not interfere with the customary use of the wagon or buggy.

This device being made of metallic bars, preferably iron, renders the same inexpensive to manufacture and both efficient and durable in use, and it is also understood that this device is susceptible of alterations in its details within the scope of the appended claims without departing from the spirit of the invention.

What is claimed is:—

1. A can carrier comprising a pair of parallel members, the outer member being curved outward at its upper end to form a handle engaging arm, means for securing the members to the axle of a vehicle over the elliptical spring, and a resilient can supporting foot bent from the lower end of the inner member to pass below the outer member.

2. A can carrier comprising an outer upright bar, and inner upright bar, curved outward at its upper end and secured to the intermediate portion of the outer bar, the upper end of the outer bar being curved outwardly to form an upper arm, a bar lying partially on the lower end of the inner bar and curved outward below the outer bar and horizontal at its free end, and means for securing said upright bars over the axle tree and elliptical spring of a vehicle.

In testimony that I claim the foregoing as my own, I have hereto affixed my signature in the presence of two witnesses.

CHARLES H. CRONK.

Witnesses:
S. H. KLINE,
S. W. GILBERT.

Copies of this patent may be obtained for five cents each, by addressing the "Commissioner of Patents, Washington, D. C."